United States Patent
Sekino et al.

(10) Patent No.: US 7,593,584 B2
(45) Date of Patent: Sep. 22, 2009

(54) ENCODING DEVICE, ENCODING METHOD, AND PROGRAM

(75) Inventors: Masanori Sekino, Kanagawa (JP);
Shunichi Kimura, Kanagawa (JP);
Yutaka Koshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 672 days.

(21) Appl. No.: 11/207,890

(22) Filed: Aug. 22, 2005

(65) Prior Publication Data
US 2006/0204117 A1    Sep. 14, 2006

(30) Foreign Application Priority Data
Mar. 14, 2005 (JP) .............................. 2005-071289

(51) Int. Cl.
*G06K 9/36* (2006.01)
(52) U.S. Cl. ..................................... 382/248
(58) Field of Classification Search ......... 382/232–233, 382/236–240, 243, 246–248, 250; 358/1.9, 358/2.1, 426.06, 426.07, 426.13–426.16; 375/240.12, 240.23, 240.24; 348/394.1, 348/404.1, 411.1, 420.1–422.1, 424.2
See application file for complete search history.

(56) References Cited

U.S. PATENT DOCUMENTS

| 5,896,403 | A  | * | 4/1999 | Nagasaki et al. | 714/752 |
| 6,563,953 | B2 | * | 5/2003 | Lin et al.      | 382/233 |
| 6,608,935 | B2 | * | 8/2003 | Nagumo et al.   | 382/233 |
| 6,876,773 | B2 | * | 4/2005 | Mizuno et al.   | 382/243 |
| 7,062,100 | B2 | * | 6/2006 | Ebner et al.    | 382/243 |
| 7,239,424 | B1 | * | 7/2007 | Berkner et al.  | 358/2.1 |

OTHER PUBLICATIONS

"Information Technology-Coded Representation of Picture and Audio Information-Lossy/Lossless Coding of Bi-Level Images," Coding of Still Pictures, JBIG Committee, ISO/IEC JTC 1/SC 29/WG 1 N 1359, pp. 11-17, Jul. 16, 1999.

* cited by examiner

*Primary Examiner*—Jose L Couso
(74) *Attorney, Agent, or Firm*—Oliff & Berridge, PLC

(57) ABSTRACT

An encoding device has a shape encoding unit and a pattern encoding unit. The shape encoding unit encodes a shape of an image element. The pattern encoding unit encodes a binary pattern of the image element and the shape of the image element is related to the binary pattern of the image element.

12 Claims, 12 Drawing Sheets

INPUT IMAGE → GENERATE IMAGE DICTIONARY → 700

INDEX 0
INDEX 1
INDEX 2
INDEX 3
INDEX 4

CODE DATA (INDICES + POSITIONS) → DECODE → 610

DOT PATTERNS VARY ACCORDING
TO PHASE OF SCREEN PROCESSING

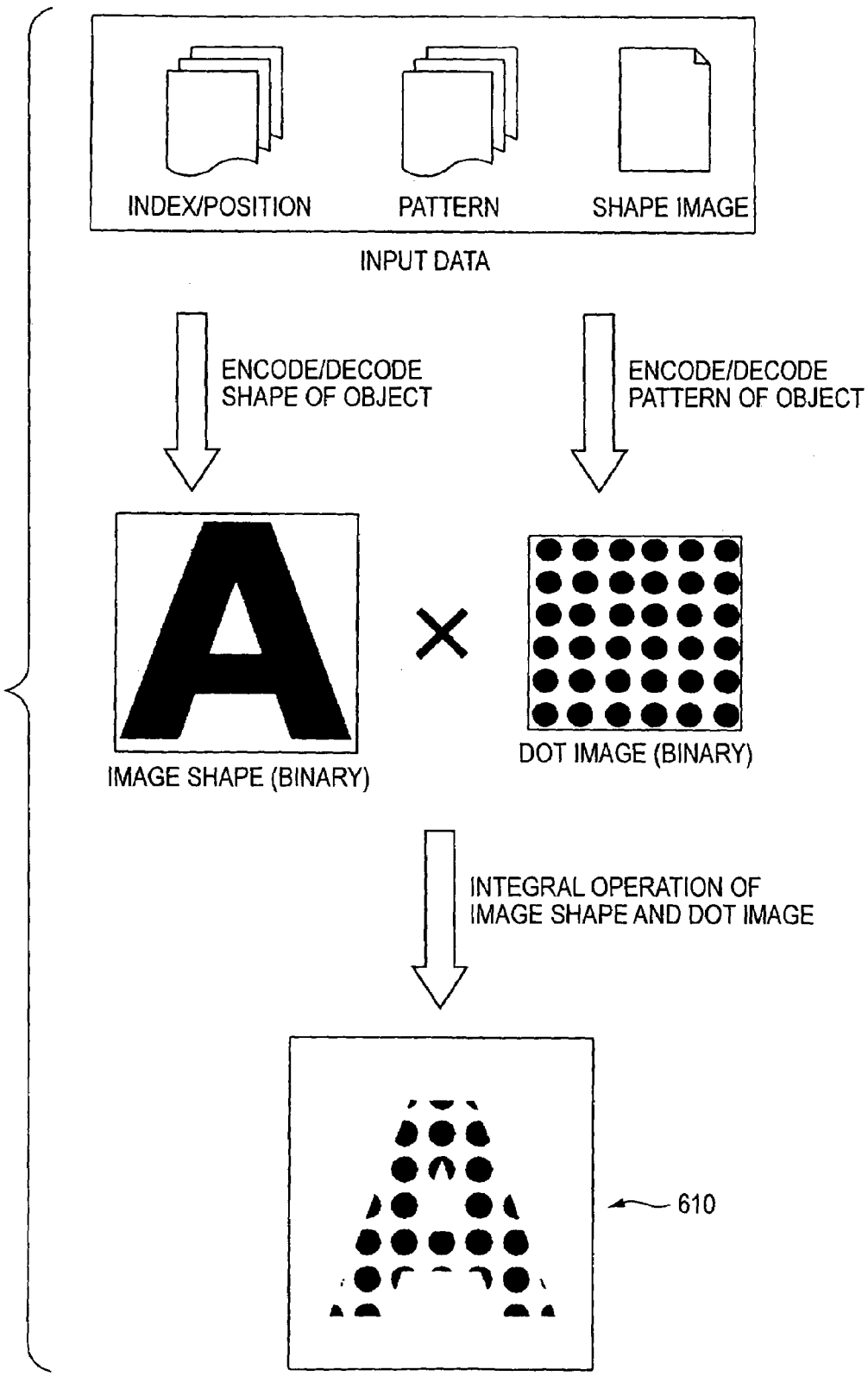

IMAGE FORMED FROM INPUT DATA

710

● INDEX 1
• INDEX 2

CODE DATA OF PATTERN INFORMATION

FIG. 8A  IMAGE FORMED FROM INPUT DATA
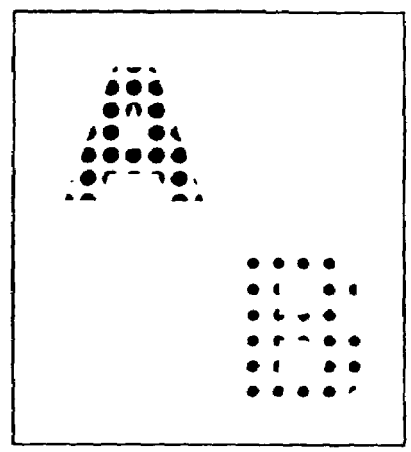
FIG. 8B
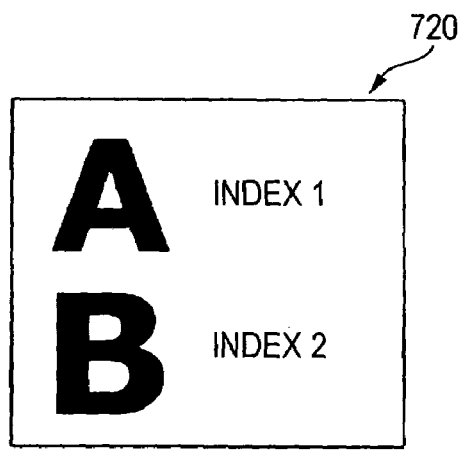
FIG. 8C  CODE DATA OF SHAPE INFORMATION
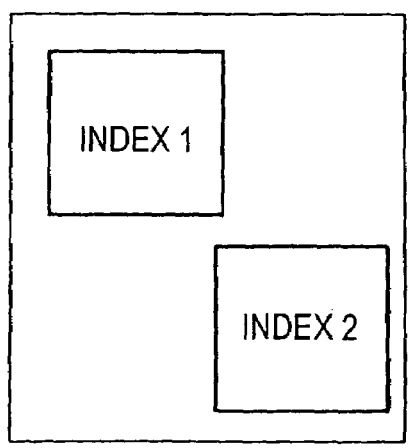

ENCODING DEVICE, ENCODING METHOD, AND PROGRAM

BACKGROUND OF THE INVENTION

1. Field of the Invention

The present invention relates to a device and a method for encoding a binary image, and more particularly, to a device and a method for encoding a binary image including image elements painted with a pattern image.

2. Description of the Related Art

For instance, ISO/IEC FCD 14492 "Lossy/lossless coding of bi-level images" discloses JBIG2 used for efficiently encoding image elements. JBIG2 defines encoding of a text region, as well as defining encoding of a generic region.

However, according to the method described in ISO/IEC FCD14492, there may arise a case where the image elements painted with a pattern image cannot be efficiently encoded.

SUMMARY OF THE INVENTION

The present invention has been conceived against the above-described background and provides an encoder for efficiently encoding image elements painted with a pattern image.

According to an aspect of the present invention, an encoding device includes a receiving unit that receives a shape of an image element and a binary pattern, a shape encoding unit that encodes the shape of the image element received by the receiving unit, and a pattern encoding unit that encodes the binary pattern received by the receiving unit. The shape to be encoded by the shape encoding unit and the binary pattern to be encoded by the pattern encoding unit are encoded so as to be paired with each other.

According to an aspect of the present invention, an encoding method includes receiving a shape of an image element and a binary pattern, encoding the shape of the received image element, and encoding the received binary pattern. The shape to be encoded and the binary pattern to be encoded are encoded so as to be paired with each other.

According to an aspect of the present invention, an encoding program for realizing a processing to a computer included in an encoding device, the encoding method includes receiving a shape of an image element and a binary pattern, encoding the shape of the received image element, and encoding the received binary pattern. The shape to be encoded and the binary pattern to be encoded are encoded so as to be paired with each other.

BRIEF DESCRIPTION OF THE DRAWINGS

Embodiments of the present invention will be described in detail based on the following figures, wherein:

FIGS. 1A and 1B are views for describing encoding of a halftone region, wherein FIG. 1A illustrates the image dictionary 700 generated from an input image through halftone region encoding operation, and FIG. 1B illustrates encoded data generated through use of the image dictionary 700 and a decoded image 610;

FIGS. 3A to 3C are views for describing text region encoding operation and generic region encoding operation, wherein FIG. 3A illustrates a case where all of dot patterns of the input image 600 are registered in an image dictionary 700b by means of the text region encoding operation, FIG. 3B illustrates a decoded image 610b generated when the input image 600 is encoded through text region encoding operation, and FIG. 3C is a view illustrating decoding of an image element of the same shape when a generic region is used;

FIG. 4 is a view for describing the overview of encoding operation and decoding operation, both of which are performed by an image processor 2;

FIGS. 7A to 7C are views for describing operation for encoding pattern information, wherein FIG. 7A illustrates an image formed from received shape data, or the like, FIG. 7B illustrates the pattern dictionary 710 corresponding to the received binary pattern, and FIG. 7C illustrates encoded data of the pattern information including the identification information and the position information, both pertaining to the binary pattern;

FIGS. 8A to 8C are views for describing operation for encoding shape information, wherein FIG. 8A illustrates an image formed from the received shape data, or the like, FIG. 8B illustrates the shape dictionary 720 corresponding to the shape of the received image element, and FIG. 8C illustrates encoded data of shape information, including shape identification information and positional information;

DETAILED DESCRIPTION OF THE INVENTION

In order to aid the understanding of the present invention, the background and general description of the present invention will initially be provided.

In halftone region encoding operation of JBIG2, dot patterns (binary patterns) are registered in an image dictionary 700, and a binary image formed from the dot patterns is encoded.

Figure 1A:
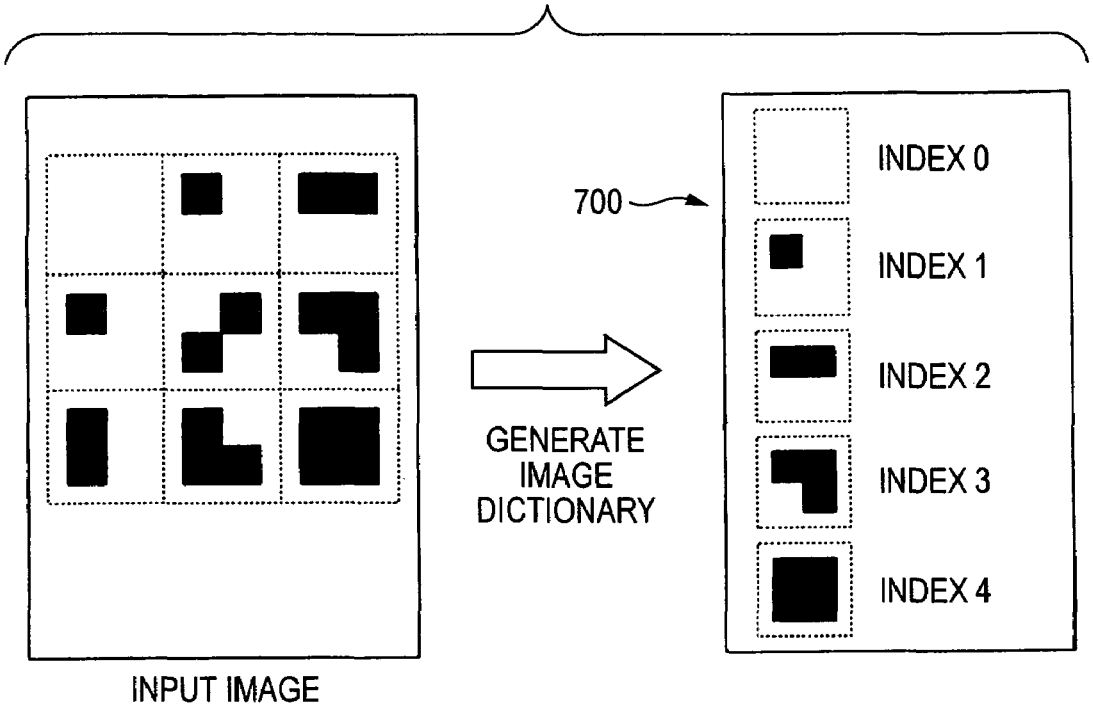
Figure 1B:
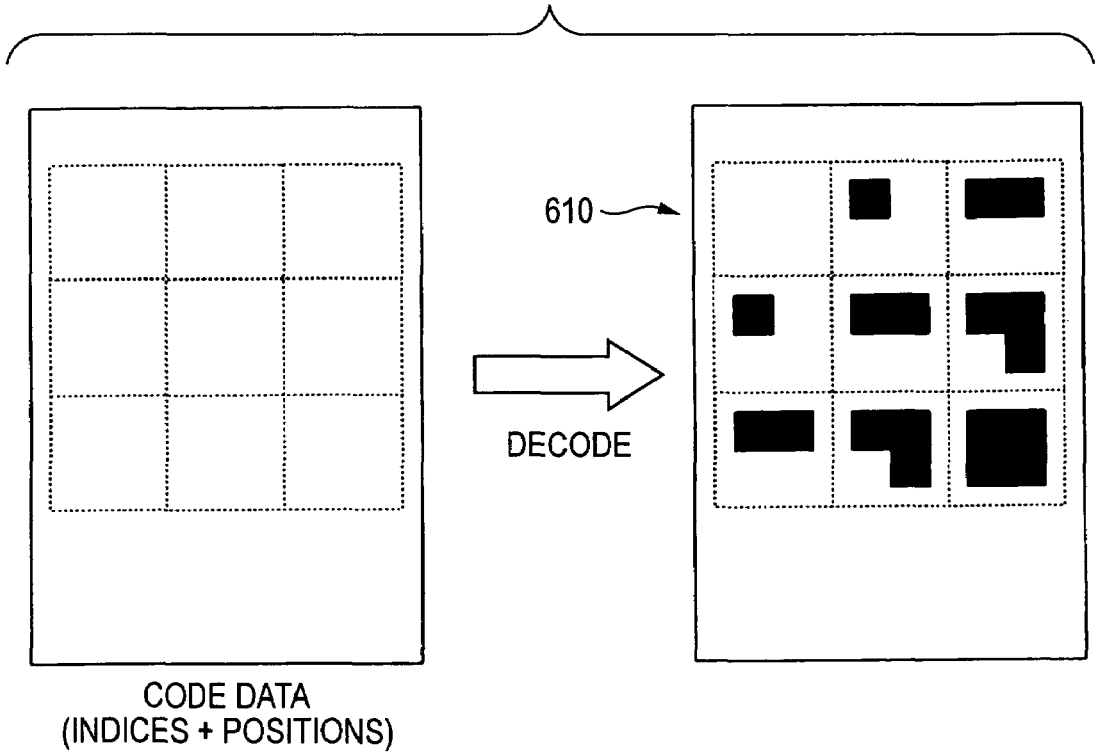

FIGS. 1A and 1B are views for describing encoding of a halftone region. FIG. 1A illustrates the image dictionary 700 generated from an input image through halftone region encoding operation, and FIG. 1B illustrates encoded data generated through use of the image dictionary 700 and a decoded image 610.

As illustrated in FIG. 1A, the input image is formed from plural dot patterns. When plural dot patterns of different sizes are present in the input image, the respective dot patterns are associated with indices and then registered in the image dictionary 700. The indices are identification information used for uniquely identifying each of the dot patterns.

When the input image is encoded through use of the image dictionary 700, encoded data, such as those illustrated in FIG. 1B, are generated. The encoded data are formed from dot patterns (i.e., indices) of respective regions in the input image and positional information showing positions where the dot patterns are present (grid positions).

The encoded data are decoded into a decoded image 610 by reference to the image dictionary 700. Specifically, the dot patterns registered in the image dictionary 700 are selected on the basis of the indices included in the encoded data. The thus-selected dot patterns are arranged in accordance with the positional information included in the encoded data, whereby the decoded image 610 is generated.

Figure 2:
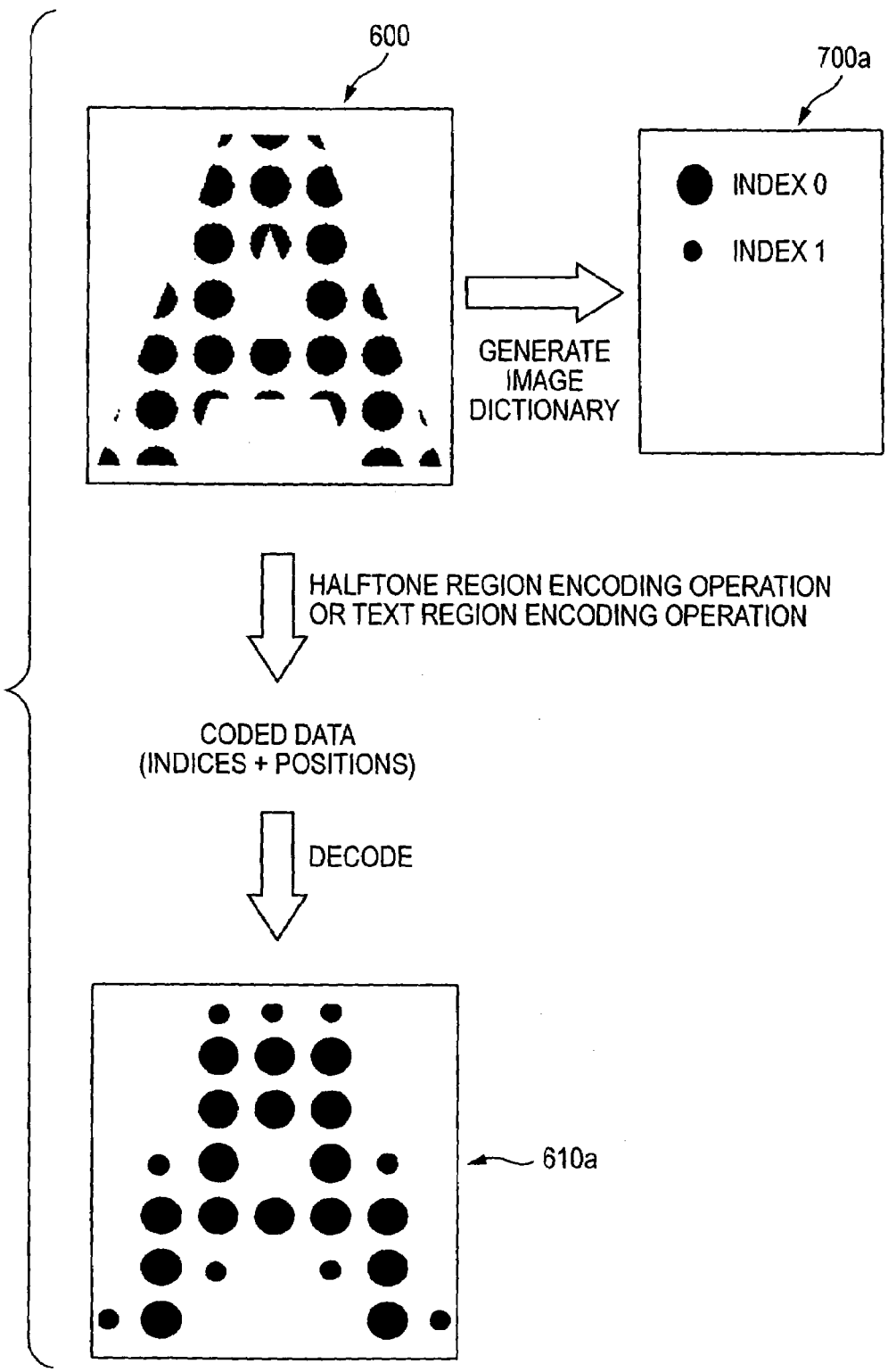
FIG. 2 is a view illustrating a decoded image 610a produced when the input image 600, where an edge exists, is encoded through halftone region encoding operation.

FIG. 2 is a view illustrating a decoded image 610 a produced when the input image 600, where an edge exists, is encoded through halftone region encoding operation.

As illustrated in FIG. 2, when the character image A having an edge is encoded through halftone encoding operation, two dot patterns are registered in an image dictionary 700a. The encoded data are formed from the dot patterns (indices) and positional information showing the positions where the dot patterns are present. The decoded image 610a is an image having lost edge information.

In relation to JBIG2, encoding of a text region and encoding of a generic region have been proposed.

Figure 3A:
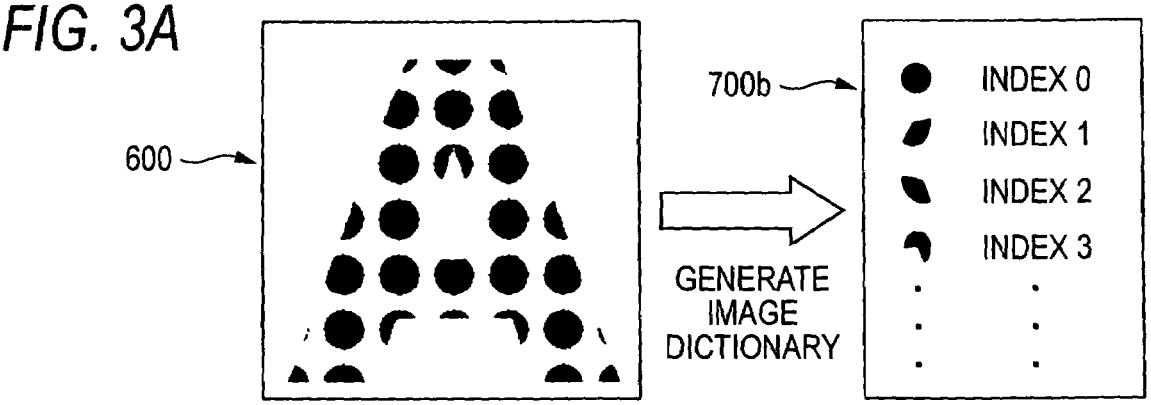
Figure 3B:
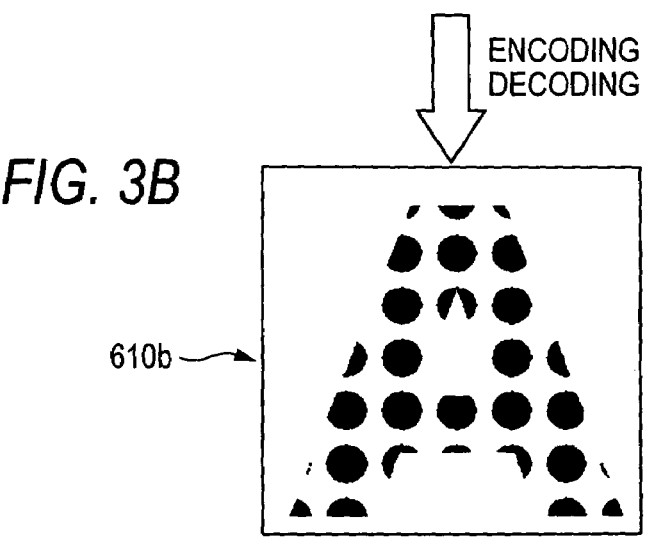
Figure 3C:
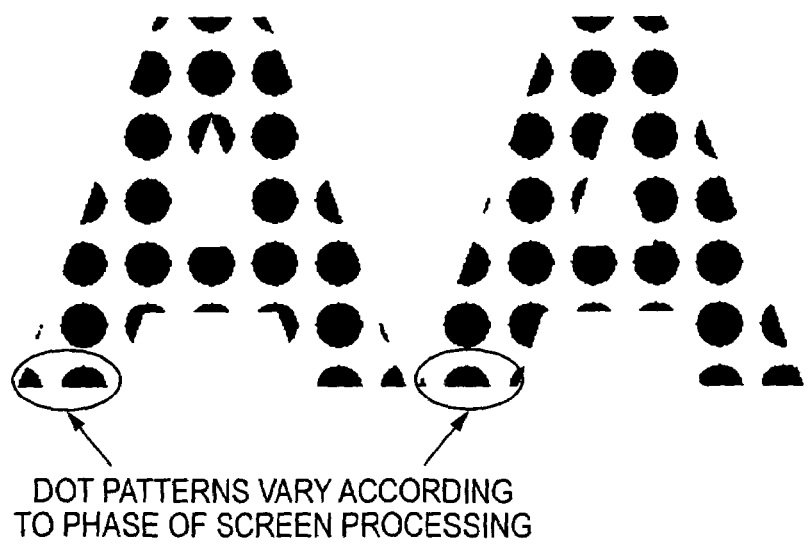

FIGS. 3A to 3C are views for describing text region encoding operation and generic region encoding operation. FIG. 3A illustrates a case where all of dot patterns of the input image 600 are registered in an image dictionary 700b by means of the text region encoding operation. FIG. 3B illustrates a decoded image 610b generated when the input image 600 is encoded through text region encoding operation. FIG. 3C is a view illustrating decoding of an image element of the same shape when a generic region is used.

In text region encoding operation, a typical image pattern appearing in the input image 600 is registered in the image dictionary in association with the index used for identifying the image pattern. The input image is encoded through use of the image dictionary.

Specifically, as illustrated in FIG. 3A, all of the dot images included in the input image 600 are registered in the image dictionary 700b through text region encoding operation. The respective dot patterns registered in the image dictionary 700b are assigned indices. The input image 600 is encoded through use of the image dictionary 700b. Specifically, respective dot images (dot images having edge information) which exist in the edge region of the input image 600 are registered as dot patterns in the image dictionary 700b. Therefore, the encoded image 610b retaining edge information is obtained.

However, the dot images existing in the edge region assume various shapes. Hence, the number of entries (registered shapes) in the image dictionary 700b is increased. Accordingly, achievement of a great compression rate becomes impossible.

In relation to JBIG2, generic region encoding operation has been proposed.

Generic region encoding operation is for encoding an input image without generating the image dictionary 700, or the like, such as that mentioned above. More specifically, generic region encoding operation is for encoding an input image by utilization of statistics about the local arrangement of pixels (e.g., a context).

However, as illustrated in FIG. 3C, even when plural image elements having a single shape (a letter image "A" in the embodiment) are present in a single input image, dot images forming these image elements become different from each other if screen processing phases of the image elements are different from each other. Achievement of a great compression rate is hindered.

[Image Processor 2]

In connection with image elements constituting an input image, an image processor 2 of the present invention acquires shape of image element plotted by a binary pattern, a binary pattern, identification information about the image element, and positional information about the image. Subsequently, the thus-acquired information items are separated into shape information and pattern information. The shape information and the pattern information are encoded, respectively. More specifically, the image processor 2 encodes the shapes of the image elements through text region encoding operation or generic region encoding operation of JBIG2, and dot patterns constituting the image elements are encoded by the halftone region encoding operation or the text region encoding operation.

FIG. 4 is a view for describing the overview of encoding operation and decoding operation, both of which are performed by the image processor 2.

As illustrated in FIG. 4, the image processor 2 of the present embodiment acquires shapes of image elements plotted in the form of binary patterns, identification information about image elements, and positional information about an image. Then, the image processor 2 associates the binary patterns of the image elements (a letter image "A" in the embodiment) with indices, and registers the binary patterns in the pattern dictionary. Pattern information, which includes the indices of the dot patterns and positional information representing a region where the dot patterns exist, is encoded through halftone region encoding operation. Moreover, the image processor 2 encodes the shape of the image element (letter image "A") included in the input image 600 through text region encoding operation or generic region encoding operation.

When decoding the encoded data pertaining to the image element (pattern information and shape information), the image processor 2 generates an image shape showing the shape of an image element, on the basis of encoded data pertaining to the shape information. On the basis of the encoded data pertaining to the pattern information, the image processor 2 arranges the dot patterns registered in a pattern dictionary 710, to thus form a dot image. The prepared image shape and the prepared dot image are subjected to integral operation, to thus generate the decoded image 610.

As mentioned above, the image forming apparatus 2 encodes the shape information and the pattern information while separating them from each other. As a result, a binary image formed from dot patterns can be efficiently encoded while the edge information about the image element (letter image "A") is retained.

When the image element of the same shape repeatedly appears in the same input image, shape information about these image elements is common, and hence a greater compression rate can be expected.

The image forming apparatus 2 of the present embodiment is more specifically described.

[Hardware Configuration]

A hardware configuration of the image processor 2 of the present embodiment will be described.

Figure 5:
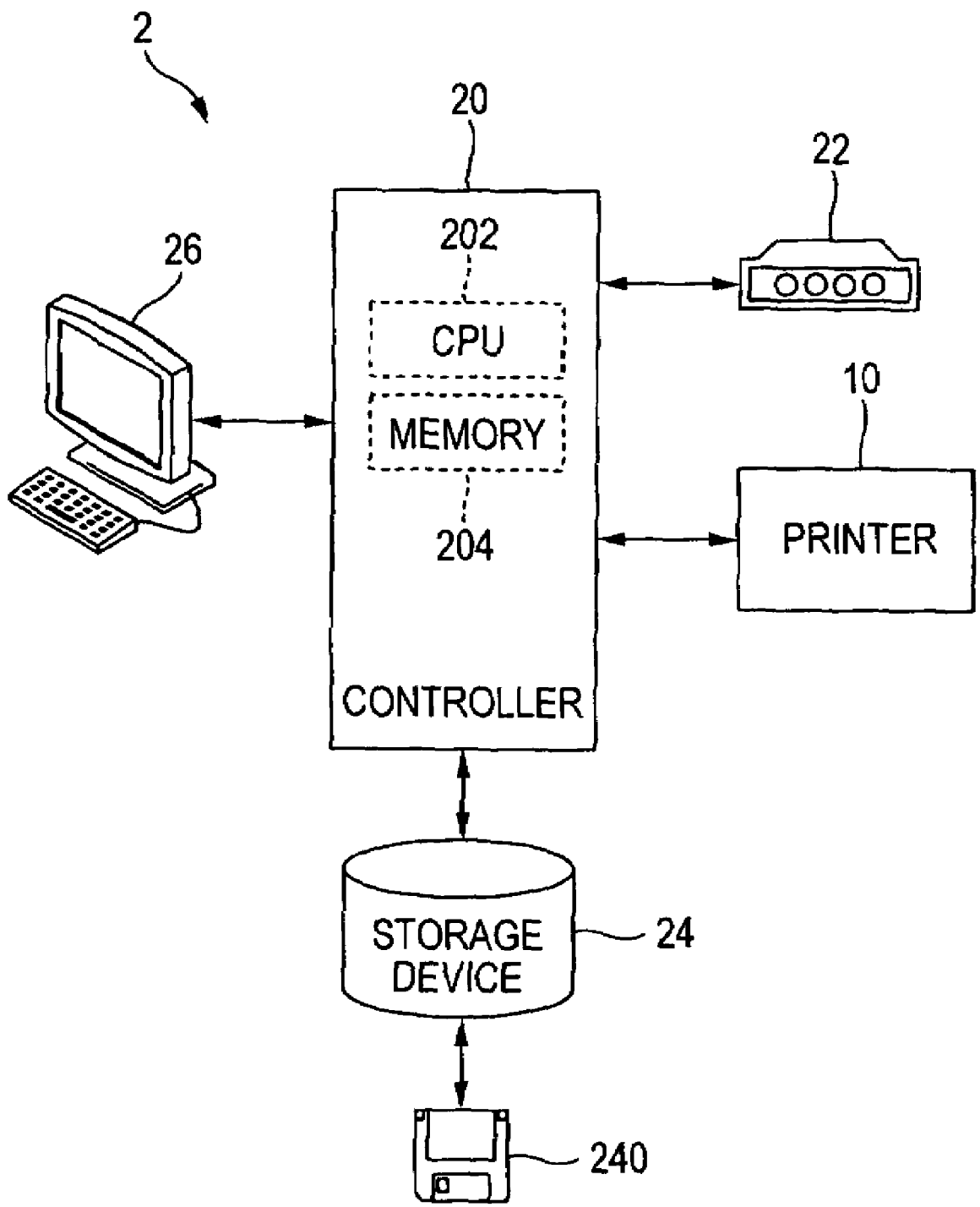
FIG. 5 is a view illustrating the hardware configuration of the image processor 2 to which the encoding method and the decoding method of the present invention are applied, with an emphasis on a controller 20.

FIG. 5 is a view illustrating the hardware configuration of the image processor 2 to which the encoding method and the decoding method of the present invention are applied, with an emphasis on a controller 20.

As shown in FIG. 5, the image processor 2 includes a controller 20, which includes a CPU 202 and memory 204, a communication device 22, a storage device 24 such as an HDD/CD device, and a user interface (UI device) including an LCD display or a CRT display device and a keyboard touch panel.

The image processor 2 is a general-purpose computer into which an encoding program 4 and a decoding program 5, both of which will be described later, are installed as a part of the printer driver. By way of the communication device 22 or the storage device 24, the image processor 2 may acquire data, such as an image shape or the like, by means of a processing system which generates the shape of an image element, a pattern, or the like, by means of software. Moreover, the image processor 2 may also acquire image data optically read by the scanner function of a printer 10, acquire data pertaining to the image shape, or the like, on the basis of the acquired image data, and encode the thus-acquired data.

[Encoding Program]

Figure 6:
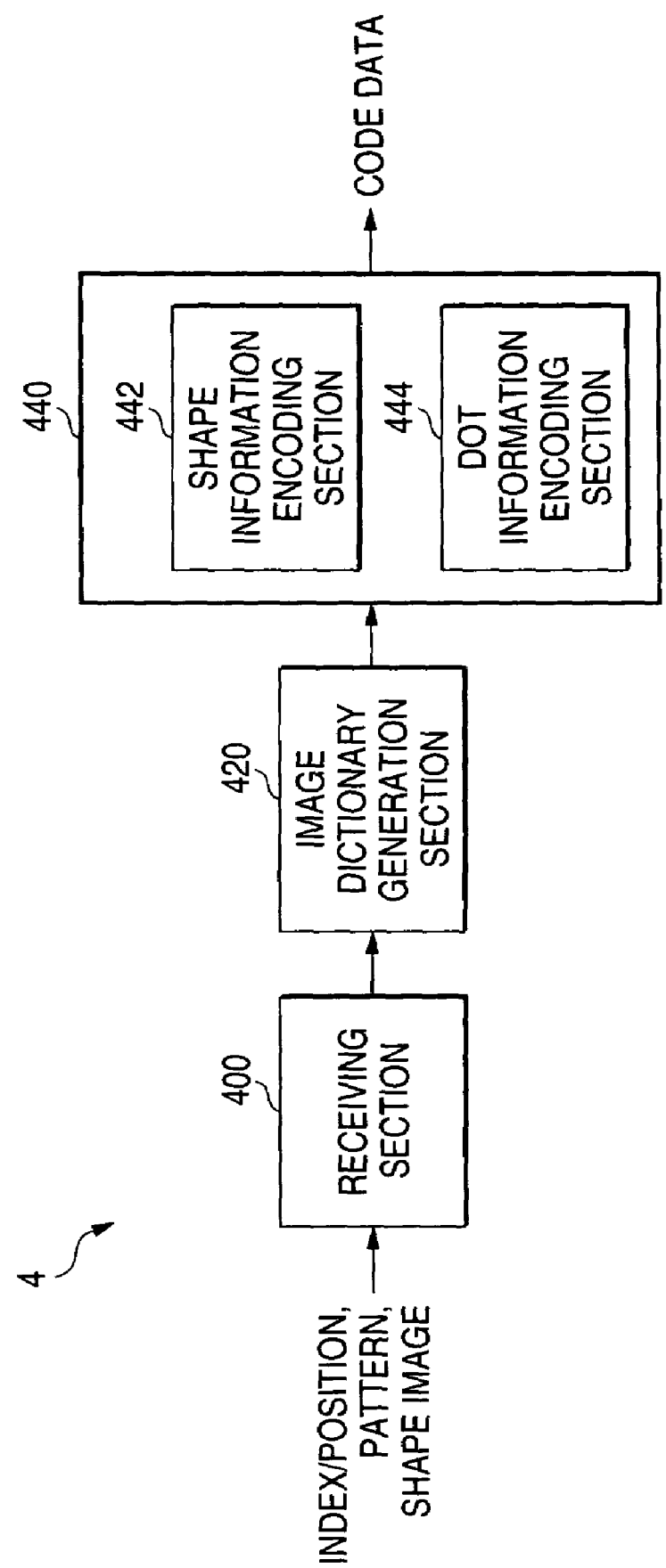
FIG. 6 is a view illustrating the functional configuration of an encoding program 4 which an encoding method of the present invention.

FIG. 6 is a view illustrating the functional configuration of an encoding program 4 which is practiced by the controller 20 (FIG. 5) and implements the encoding method of the present invention.

As illustrated in FIG. 6, the encoding program 4 has a receiving section 400, an image dictionary generation section 420, and a code generation section 440. The code generation section 440 includes a shape information encoding section 442 and a dot information encoding section 444.

The encoding program 4 may be completely or partially implemented by an ASIC provided in the printer 10.

In the encoding program 4, the receiving section 400 acquires the shape of an image element plotted by a binary pattern, identification information about the image element, and positional information about an image, by way of the communication device 22 or the storage device 24. The thus-acquired shape, or the like, is output to the image dictionary generation section 420.

On the basis of the shape of the image element input by way of the receiving section 400, the image dictionary generation section 420 generates the pattern dictionary 710 (which will be described later by reference to FIGS. 7A to 7C) applied to encoding of pattern information and a shape dictionary 720 (which will be described later by reference to FIGS. 8A to 8C) applied to encoding of the shape information. The thus-generated pattern dictionary 710 and the generated shape dictionary 720 are output to the code generation section 440.

The code generation section 440 encodes the image element on the basis of the pattern dictionary 710 and the shape dictionary 720, both of which are input by way of the image dictionary generation section 420. Code data pertaining to the encoded image element and the image dictionaries (the pattern dictionary 710 and the shape dictionary 720) are output to the storage device 24 (FIG. 5) or the printer 10.

The shape information encoding section 442 encodes the shape of the image element, the identification information, and the positional information by means of text region encoding operation or generic region encoding operation.

The dot information encoding section 444 encodes the pattern of the image element, the identification information, and the positional information by means of halftone region encoding operation.

Here, the shape of the image element encoded by the shape information encoding section 442 and the pattern of the image element encoded by the dot information encoding section 444 are encoded on the basis of identification information so as to be paired with each other.

Figure 7A:
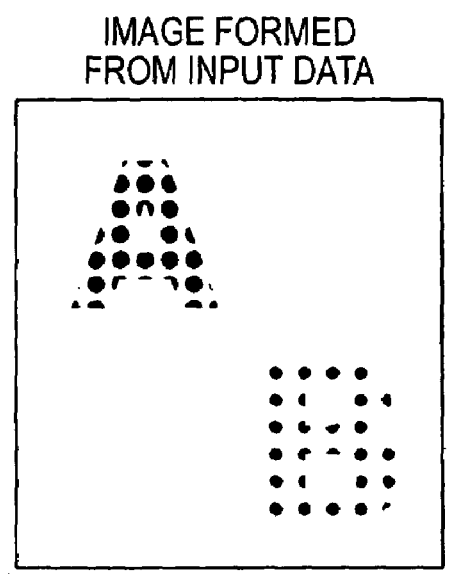
Figure 7B:
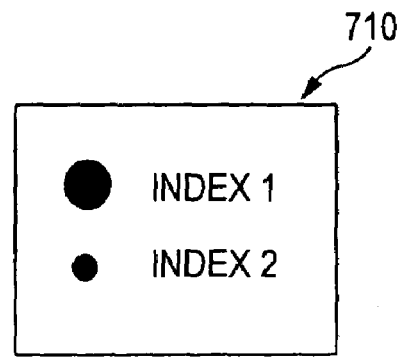
Figure 7C:
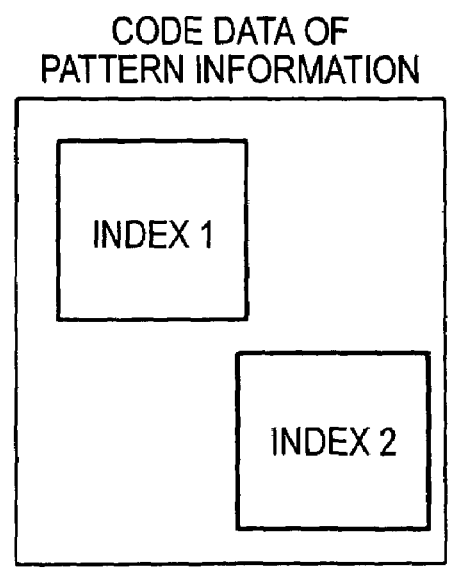

FIGS. 7A to 7C are views for describing operation for encoding pattern information. FIG. 7A illustrates an image formed from received shape data, or the like, FIG. 7B illustrates the pattern dictionary 710 corresponding to the received binary pattern, and FIG. 7C illustrates encoded data of the pattern information including the identification information and the position information, both pertaining to the binary pattern.

As illustrated in FIG. 7A, the input image is uniquely formed from the shape of the received image element, the binary pattern, the identification information about the image element, and the positional information about the image. There may be a case where the binary pattern includes plural binary patterns. In the embodiment, the binary pattern of letter image "A" and a binary pattern of letter image "B" are different from each other.

In such a case, as illustrated in FIG. 7B, the respective dot patterns are registered in the pattern dictionary 710 by means of the image dictionary preparation section 420.

As illustrated in FIG. 7C, a dot information encoding section 444 (FIG. 6) encodes a pair consisting of positional information about a region having the binary patterns registered in the pattern dictionary 710 and the indices assigned to the binary patterns of this region, by means of halftone region encoding operation, to thus generate encoded data of the pattern information.

FIGS. 8A to 8C are views for describing operation for encoding shape information. FIG. 8A illustrates an image formed from the received shape data, or the like, FIG. 8B illustrates the shape dictionary 720 corresponding to the shape of the received image element, and FIG. 8C illustrates encoded data of shape information, including shape identification information and positional information.

As illustrated in FIG. 8A, there may be a case where the received image element includes plural image element of different shapes. In the embodiment, the shape of letter image "A" and that of letter image "B" are different from each other.

In such a case, as illustrated in FIG. 8B, the shapes of the letter images are registered in the shape dictionary 720 by the image dictionary generation section 420.

As illustrated in FIG. 8C, the shape information encoding section 442 encodes a pair consisting of positional information about a region having the binary patterns registered in the shape dictionary 720 and the indices coinciding in shape with the image elements, by means of text region encoding operation, to thus generate encoded data of the shape information. The shape information encoding section 442 may encode shape information by means of generic region encoding operation without use of the shape dictionary 720.

Figure 9:
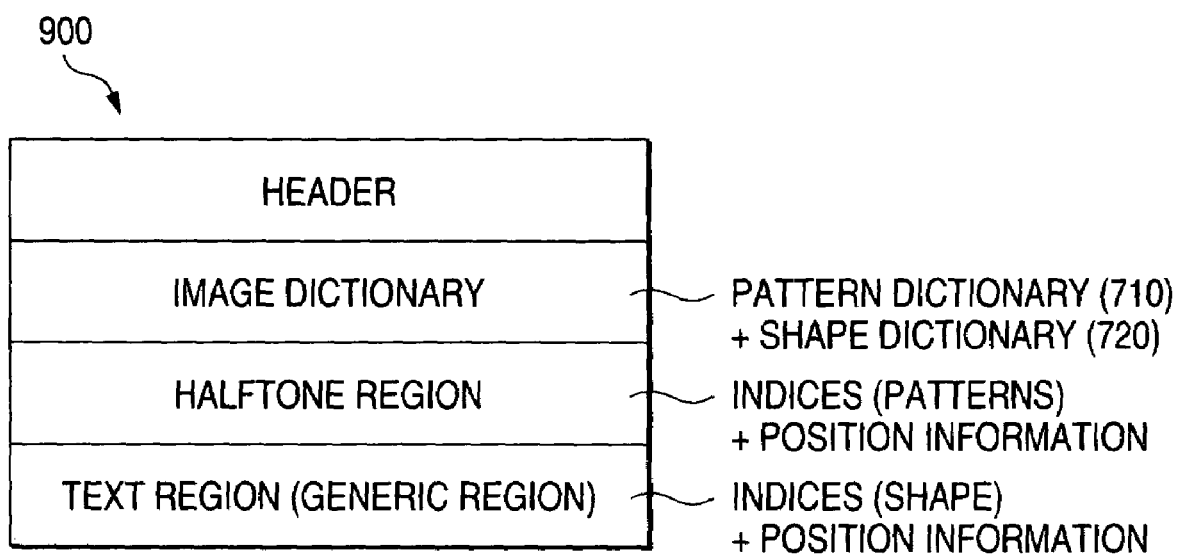
FIG. 9 is a view illustrating encoded data 900 generated by the encoding program 4.

FIG. 9 is a view illustrating encoded data 900 generated by the encoding program 4 (FIG. 6).

As illustrated in FIG. 9, the encoded data 900 includes a header including attribute information about data, an image dictionary consisting of the pattern dictionary 710 and the shape dictionary 720, a halftone region code corresponding to encoded data of the pattern information, and a text region code (or a generic region code) corresponding to encoded data of the shape information.

Binary patterns and indices used for identifying the binary patterns are registered in an associated manner in the pattern dictionary 710.

The shape of an image element and indices used for identifying the shape are registered in an associated manner in the shape dictionary 720.

The halftone region code includes a pair consisting of the indices assigned to the binary patterns and positional information indicating a region where the binary patterns exist.

The text region code (or the generic region code) includes a pair consisting of the indices corresponding to the shape of an image element and positional information indicating a location where the image element exist.

[Encoding Operation]

Figure 10:
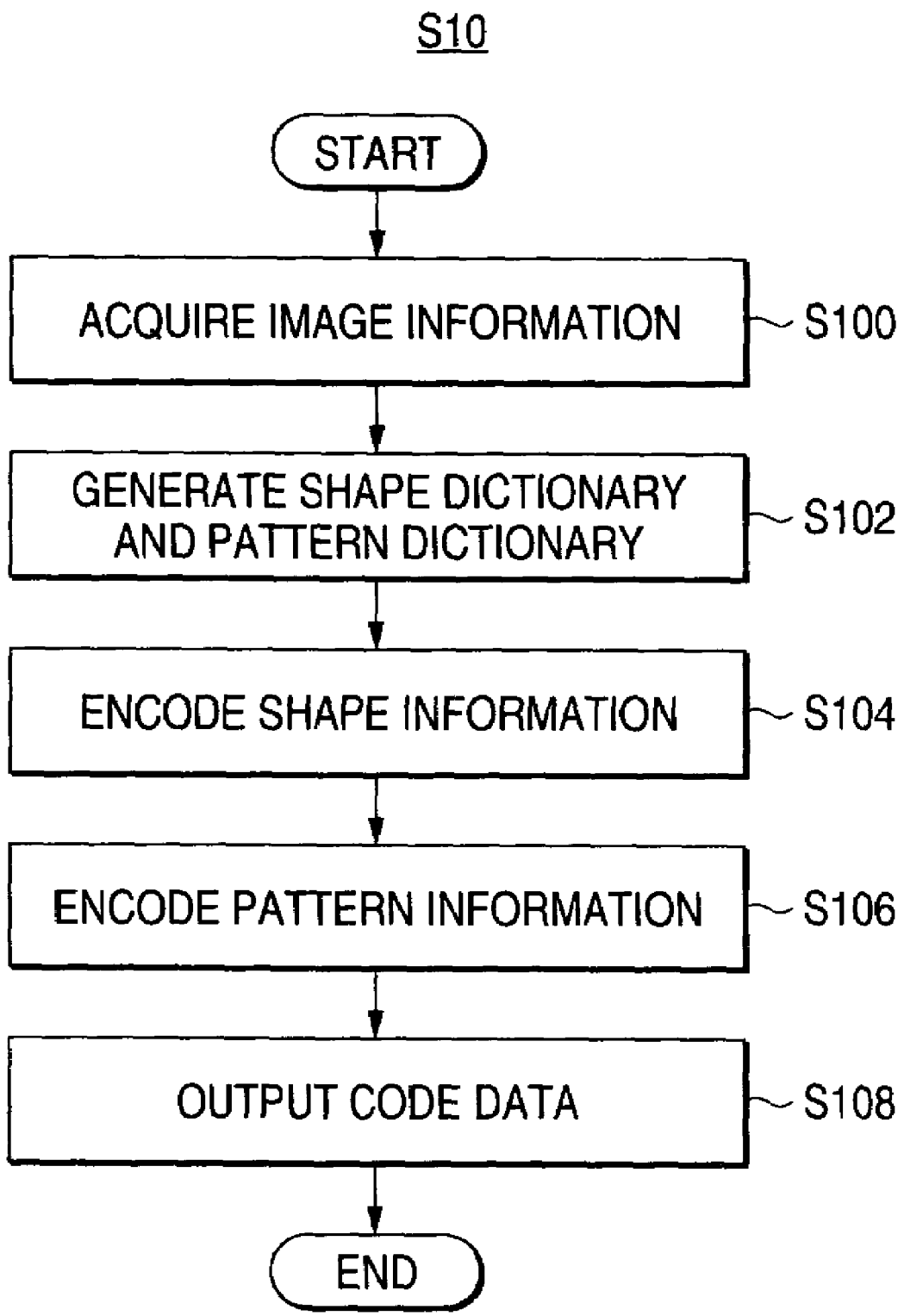
FIG. 10 is a flowchart showing encoding operation (S10) performed by the encoding program 4.

FIG. 10 is a flowchart showing encoding operation (S10) performed by the encoding program 4. The embodiment describes, as a specific example, a case where the shape of the letter image plotted by binary patterns, the binary patterns, the identification information about the letter image, and positional information about the image are input.

As illustrated in FIG. 10, instep 100 (S100), the receiving section 400 acquires data indicating the shape of a letter image, data showing binary patterns, and data indicating identification and positional information about an image element, and outputs the thus-acquired data to the image dictionary generation section 420.

In step 102 (S102), on the basis of the shape and positional information about the letter image input by way of the receiving section 400, the image dictionary generation section 420 generates the shape dictionary 720 (FIGS. 8A to 8C) to be applied to operation for encoding shape information. On the basis of the binary patterns and positional information, both of which pertain to, the letter image, the image dictionary generation section 420 generates the pattern dictionary 710 (FIGS. 7A to 7C) applied to operation for encoding pattern information. The image dictionary generation section 420 outputs the thus-generated pattern dictionary 710 and the shape dictionary 720 to the code generation section 440.

In step 104 (S104), the shape information encoding section 442 encodes a shape, identification information, and positional information, all of which pertain to the image element, through halftone region encoding operation.

In step 106 (S106), the dot information encoding section 444 encodes a pattern, identification information, and positional information, all of which pertain to an image element, through halftone region encoding operation.

In step 108 (S108), the code generation section 440 generates Huffman codes corresponding to the shape information (indices assigned to a shape and positional information) output from the shape information encoding section 442, pattern information (indices assigned to binary patterns and positional information) output from the dot information encoding section 444, the shape dictionary 720, and the pattern dictionary 710. The thus-generated encoded data are output for the format of encoded data 900 (FIG. 9) as shape information, pattern information, and encoded data pertaining to the shape dictionary 720 and the pattern dictionary 710.

[Decoded Program]

Figure 11:
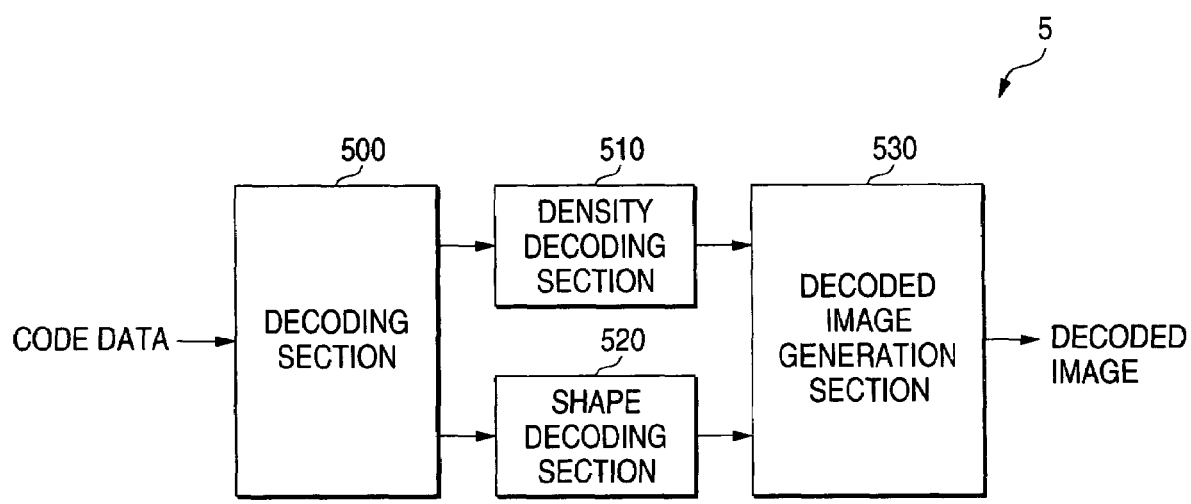
FIG. 11 is a view illustrating the functional configuration of the decoding program 5 which implements a decoding method of the present invention.

FIG. 11 is a view illustrating the functional configuration of the decoding program 5 which is executed by the controller 20 (FIG. 5) and implements a decoding method of the present invention.

As illustrated in FIG. 11, the decoding program 5 has a decoding section 500, a density decoding section 510, a shape decoding section 520, and a decoded image generation section 530.

All or some of functions of the decoding program 5 may be implemented by an ASIC provided in the printer 10.

By means of the decoding program 5, a decoding processing section 500 decodes input encoded 900 (FIG. 9) into a set consisting of indices and positional information, the image dictionary (the pattern dictionary 710 and the shape dictionary 720), or the like. Indices pertaining to the pattern information, positional information (i.e., a text region code or a generic region code), and the pattern dictionary 710 are output to the density decoding section 510. The indices assigned to the shape information, the positional information (i.e., a halftone region code), and the shape dictionary 720 are output to the shape decoding section 520.

The density decoding section 510 decodes pattern information about an input image, on the basis the indices assigned to the pattern information input from the decoding section 500 and the pattern dictionary 710. More specifically, the density decoding section 510 arranges the dot patterns registered in the pattern dictionary 710, in accordance with the indices assigned to the pattern information input by way of the decoding section 500 and the positional information, thereby generating a dot image as illustrated in FIG. 4.

On the basis of the shape information input by way of the decoding section 500, the shape decoding section 520 decodes shape information about an image element included in the input image. More specifically, the shape decoding section 520 arranges shape patterns registered in the shape dictionary 720 in accordance with the indices assigned to the shape information input by way of the decoding section 500 and the positional information, to thus generate an image shape as illustrated in FIG. 4.

On the basis of the pattern information decoded by the density decoding section 510 and the shape information decoded by the shape decoding section 520, the decoded image generation section 530 decodes encoded data pertaining to the input image 600, to thus generate a decoded image 610 (FIG. 4). More specifically, the decoded image generation section 530 subjects, to combination operation (e.g., integration operation), the dot image (a group of dot patterns arranged in accordance with indices and positional information) generated by the density decoding section 510 and an image shape (a group of shape patterns arranged in accordance with indices and positional information) generated by the shape decoding section 520, to thus generate the decoded image 610.

[Decoding Operation]

Figure 12:
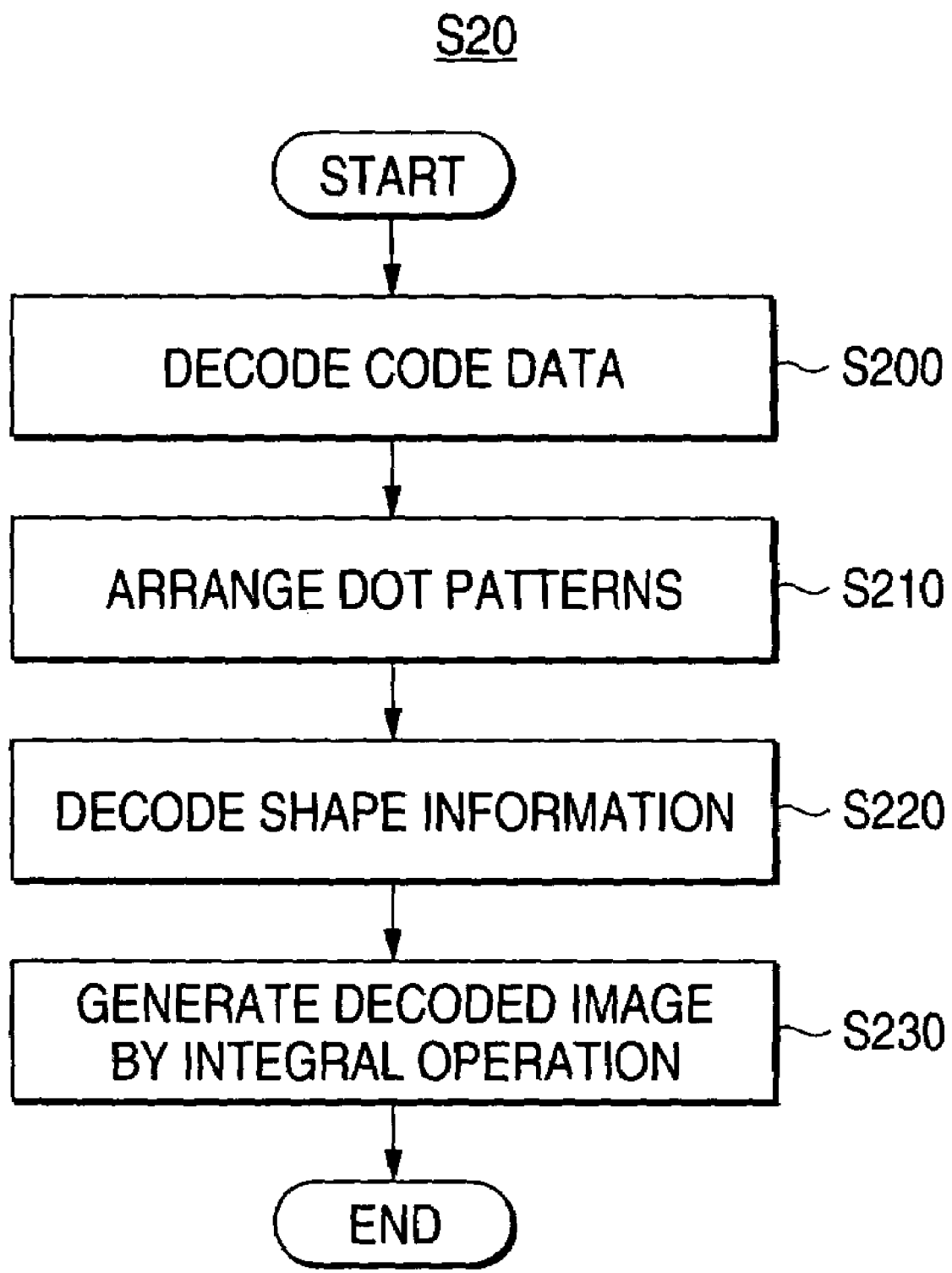
FIG. 12 is a flowchart showing decoding operation (S20) performed by the decoding program 5.

FIG. 12 is a flowchart showing decoding operation (S20) performed by the decoding program 5.

As shown in FIG. 12, in step 200 (S200), the decoding section 500 decodes the input decoded data 900 (FIG. 9) into a halftone region code (a set consisting of indices assigned to pattern information and positional information), a text region code (a set consisting of indices assigned to shape information and positional information), and the image dictionary (the pattern dictionary 710 and the shape dictionary 720). Indices assigned to pattern information, positional information, and the pattern dictionary 710 are output to the density decoding section 510, and indices assigned to the shape information, the positional information, and the shape dictionary 720 are output to the shape decoding section 520.

In step 210 (S210), the density decoding section 510 extracts the dot pattern corresponding to indices from the pattern dictionary 710, on the basis of indices assigned to the pattern information and positional information, both having been input by way of the decoding section 500. The thus-extracted dot pattern is arranged in a region indicted by the positional information. The image—in which the dot pattern has been arranged—is input to the decoded image generation section 530 as a dot image (FIG. 4).

In step 220 (S220), the shape decoding section 520 extracts the shape patterns assigned to indices, on the basis of the indices assigned to the shape information and the positional information, both of which have been input byway of the decoding section 500. The thus-extracted shape pattern is arranged in the region indicated by the positional information. The image—in which the shape pattern is arranged—is input to the decoded image generation section 530 as an image shape (FIG. 4).

In step 230 (S230), the decoded image generation section 530 subjects, to integration operation, the dot image (a group of dot patterns arranged in accordance with indices and positional information) generated by the density decoding section 510 and the image shape (a group of shape patterns arranged in accordance with indices and positional information) generated by the shape decoding section 520, to thus generate a decoded image 610 (FIG. 4).

As has been described above, the image processor 2 of the present embodiment encodes the shape information and the pattern information, in a separated manner. As a result, the binary image formed from the dot patterns can be efficiently coded while edge information about the image element is retained.

The image processor 2 can independently delete redundancy of the shape information and that of the pattern information. Hence, a greater compaction rate can be expected.

As illustrated in FIGS. 7A to 7C, the present embodiment has been described by taking, as a specific example, a case where plural binary patterns exist in one input image 600. For this reason, positional information corresponding to a pattern must be taken as a part of pattern information. However, when only one binary pattern exists in one input image 600, positional information corresponding to the pattern is not necessary.

Preferably, the shape encoding unit encodes the shape of the image element through use of a shape dictionary which associates the shape of the image element with identification information used for identifying the shape.

Preferably, the pattern encoding unit encodes the binary pattern of the image element through use of a pattern dictionary which associates the binary pattern of the image element with identification information for identifying the binary pattern.

According to the encoding device of the present invention, the image element painted with a pattern image can be efficiently encoded.

The entire disclosure of Japanese Patent Application No. 2005-071289 filed on Mar. 14, 2005 including specification, claims, drawings and abstract is incorporate herein by reference in its entirety.

What is claimed is:

1. An encoding device comprising:
   a receiving unit that receives a shape of an image element convoluted with a binary halftone dot pattern;
   a shape encoding unit that separates the shape of the image element from the binary halftone dot pattern and encodes the shape of the image element received by the receiving unit;
   a pattern encoding unit that separates the binary halftone dot pattern from the shape of the image element and encodes the binary halftone dot pattern received by the receiving unit;
   an output unit that outputs the encoded binary halftone dot pattern and the encoded shape of the image element; and
   a processor that controls the receiving unit, the shape encoding unit, the pattern encoding unit and the output unit, wherein
   the shape encoded by the shape encoding unit and the binary halftone dot pattern encoded by the pattern encoding unit are encoded so as to-be paired with each other.

2. The encoding device according to claim 1, wherein the shape encoding unit encodes the shape of the image element through use of a shape dictionary which associates the shape of the image element with identification information for identifying the shape.

3. The encoding device according to claim 1, wherein the pattern encoding unit encodes the binary halftone dot pattern of the image element through use of a pattern dictionary which associates the binary halftone dot pattern of the image element with identification information for identifying the binary halftone dot pattern.

4. An encoding method comprising wherein the method is executed by a processor:
   receiving a shape of an image element convoluted with a binary halftone dot pattern;
   separating the shape of the received image from the received binary halftone dot pattern;
   encoding the shape of the received image element;
   encoding the received binary halftone dot pattern; and
   outputting the encoded shape of the image element and the encoded binary halftone dot pattern, wherein
   the shape to be encoded and the binary halftone dot pattern to be encoded are encoded so as to be paired with each other.

5. The encoding method according to claim 4, wherein the shape of the received image element is encoded by using a shape dictionary and the shape dictionary has the shape of the image element and identification information for identifying the shape.

6. The encoding method according to claim 4, wherein the received binary halftone dot pattern encoded by using a pattern dictionary and the pattern dictionary has the binary halftone dot pattern of the image element and identification information for identifying the binary halftone dot pattern.

7. A computer readable medium storing a encoding computer program for causing a computer to execute an encoding method, the encoding method comprising:
   receiving a shape of an image element convoluted with a binary halftone dot pattern;
   separating the shape of the received image from the received binary halftone dot pattern;
   encoding the shape of the received image element; and
   encoding the received binary halftone dot pattern, wherein
   the shape to be encoded and the binary halftone dot pattern to be encoded are encoded so as to be paired with each other.

8. The computer readable medium according to claim 7, wherein the shape of the received image element is encoded by using a shape dictionary and the shape dictionary has the shape of the image element and identification information for identifying the shape.

9. The computer readable medium according to claim 7, wherein the received binary halftone dot pattern encoded by using a pattern dictionary and the pattern dictionary has the binary halftone dot pattern of the image element and identification information for identifying the binary halftone dot pattern.

10. An encoding device comprising:
    a shape encoding unit that separates a shape of an image element from a binary halftone dot pattern and encodes the shape of an image element;
    a pattern encoding unit that separates the binary halftone dot pattern from the shape of the image element and encodes a binary halftone dot pattern of the image element;
    an output unit that outputs the encoded shape of the image element and the encoded binary halftone dot pattern of the image; and
    a processor that controls the shape encoding unit, the pattern encoding unit and the output unit, wherein
    the shape of the image element is related to the binary halftone dot pattern of the image element.

11. The encoding device according to claim 10, wherein the encoding device refers to a dictionary and the dictionary has at least one of the shape of the image element, the binary halftone dot pattern of the image element, identification information of the image element and positional information of the image element.

12. The computer readable medium according to claim 7, the encoding method further comprising:

outputting the encoded shape of the image element and the encoded binary halftone dot pattern.

* * * * *